No. 743,632. Patented November 10, 1903.

UNITED STATES PATENT OFFICE.

CHARLES E. GALE, OF UTICA, NEW YORK, ASSIGNOR OF ONE-HALF TO MARTIN G. WHITNEY, OF WATERTOWN, NEW YORK.

PLASTIC COMPOUND.

SPECIFICATION forming part of Letters Patent No. 743,632, dated November 10, 1903.

Application filed April 20, 1903. Serial No. 153,464. (No specimens.)

*To all whom it may concern:*

Be it known that I, CHARLES EDISON GALE, a citizen of the United States, residing at Utica, in the county of Oneida and State of New York, have invented a new and useful Composition of Matter to be Used for Making Tight Joints Between Glass and the Holding-Frame Therefor, of which the following is a specification.

My newly-invented composition of matter relates more particularly to plastic compounds, and in one approved form consists of the following ingredients combined or intermixed in substantially the proportions stated, viz: whiting, one pound; white lead, (dry,) one-fourth pound; beeswax, one-half pound; ground or powdered cork, one-fourth pound; tallow, one pound; machine-oil, one tablespoonful.

To make a plastic composition for the purposes in view, the beeswax and tallow are melted together, and when liquefied the whiting and white lead, also the finely ground or pulverized cork, are intermixed, and to said composition is added machine-oil. The ingredients are then kneaded or worked until the composition assumes a consistency like that of putty, and if not thick enough whiting is added in sufficient quantity. The resulting product is pliable and waterproof, will not oxidize or harden on exposure to air, and its viscidity is such that it will adhere to wood, but will not stick to glass.

The composition is designed as a pliable holding and packing means for securing glass in sash or other frames, the frames being preferably constructed with a recess, which is filled with the composition, after which the glass is forced into the recess to make a tight joint between the glass and frame, and as the composition is elastic and waterproof it will form an air-tight joint between the frame and glass, and when the glass is forced in place any excess of the composition will be pressed out of the recess and can be readily removed.

The composition may be used to secure glass in sash and door-frames or for making aquariums or transparent vessels where sheets of glass are held in frames.

The composition is not solely relied upon to hold the glass in place, its purpose being to form a flexible cement between the glass and frame, thereby doing away with rubber or felt packings, putty, or holding-strips.

The whiting and white lead form the basis of the compound, the beeswax and tallow keep the foregoing ingredients soft, the ground cork gives elasticity or pliability to the mass, and the machine-oil, which is a non-drying lubricant, prevents the lead and other ingredients adhering to the glass.

Having thus described my invention, I do not limit myself to the exact proportions hereinbefore stated, but claim—

1. The herein-described composition of matter as a filling or packing for the purpose set forth, consisting of whiting, white lead, beeswax, tallow and ground or powdered cork, substantially as set forth.

2. A composition of matter for the purpose set forth consisting of whiting, white lead, beeswax, tallow, powdered cork and machine-oil in the proportions specified.

In testimony whereof I have signed my name in the presence of two witnesses.

CHARLES E. GALE.

Witnesses:
 EUGENE W. JOHNSON,
 C. N. WALKER.